United States Patent
James-Burris et al.

(10) Patent No.: US 9,126,752 B2
(45) Date of Patent: Sep. 8, 2015

(54) AMBIENT CURE PIGMENTED OR CLEAR TOP COAT NON-ISOCYANATE SYSTEM

(71) Applicant: SEYMOUR OF SYCAMORE INC., Sycamore, IL (US)

(72) Inventors: Debra A. James-Burris, Elgin, IL (US); William G. Zanellato, Sycamore, IL (US)

(73) Assignee: SEYMOUR OF SYCAMORE INC., Sycamore, IL (US)

( * ) Notice: Subject to any disclaimer, the term of this patent is extended or adjusted under 35 U.S.C. 154(b) by 280 days.

(21) Appl. No.: 13/916,111

(22) Filed: Jun. 12, 2013

(65) Prior Publication Data

US 2014/0371349 A1    Dec. 18, 2014

(51) Int. Cl.
```
B29C 47/10   (2006.01)
B65D 83/14   (2006.01)
B65D 83/68   (2006.01)
B05B 11/00   (2006.01)
B65B 3/12    (2006.01)
B65D 83/42   (2006.01)
C09D 5/02    (2006.01)
```

(52) U.S. Cl.
CPC .......... *B65D 83/752* (2013.01); *B05B 11/0081* (2013.01); *B65B 3/12* (2013.01); *B65D 83/425* (2013.01); *B65D 83/682* (2013.01); *B65D 83/687* (2013.01); *C09D 5/021* (2013.01)

(58) Field of Classification Search
CPC ..... B65D 83/752; B65D 83/862; C09D 5/021
USPC .......................................... 523/348; 239/304
See application file for complete search history.

(56) References Cited

U.S. PATENT DOCUMENTS

```
6,135,165    A  * 10/2000  Zanellato et al. ............ 141/3
2006/0027280 A1 *  2/2006  Heatley et al. ............... 141/9
2006/0260714 A1 * 11/2006  Heatley et al. ............ 141/329
```

* cited by examiner

*Primary Examiner* — Hannah Pak

(74) *Attorney, Agent, or Firm* — McDonnell Boehnen Hulbert & Berghoff LLP

(57) ABSTRACT

A spray system for formulating an ambient curable clear coat product includes a first container containing a mixture of a polymer with primary hydroxyl functionality and an amino crosslinker with alkoxymethyl functionality and a propellant and a second container containing a catalyst formulated to initiate a polymerization reaction of the polymer and crosslinker when added to the first container. The system also includes a charging device configured to transfer the catalyst from the second container to the first container.

13 Claims, 1 Drawing Sheet

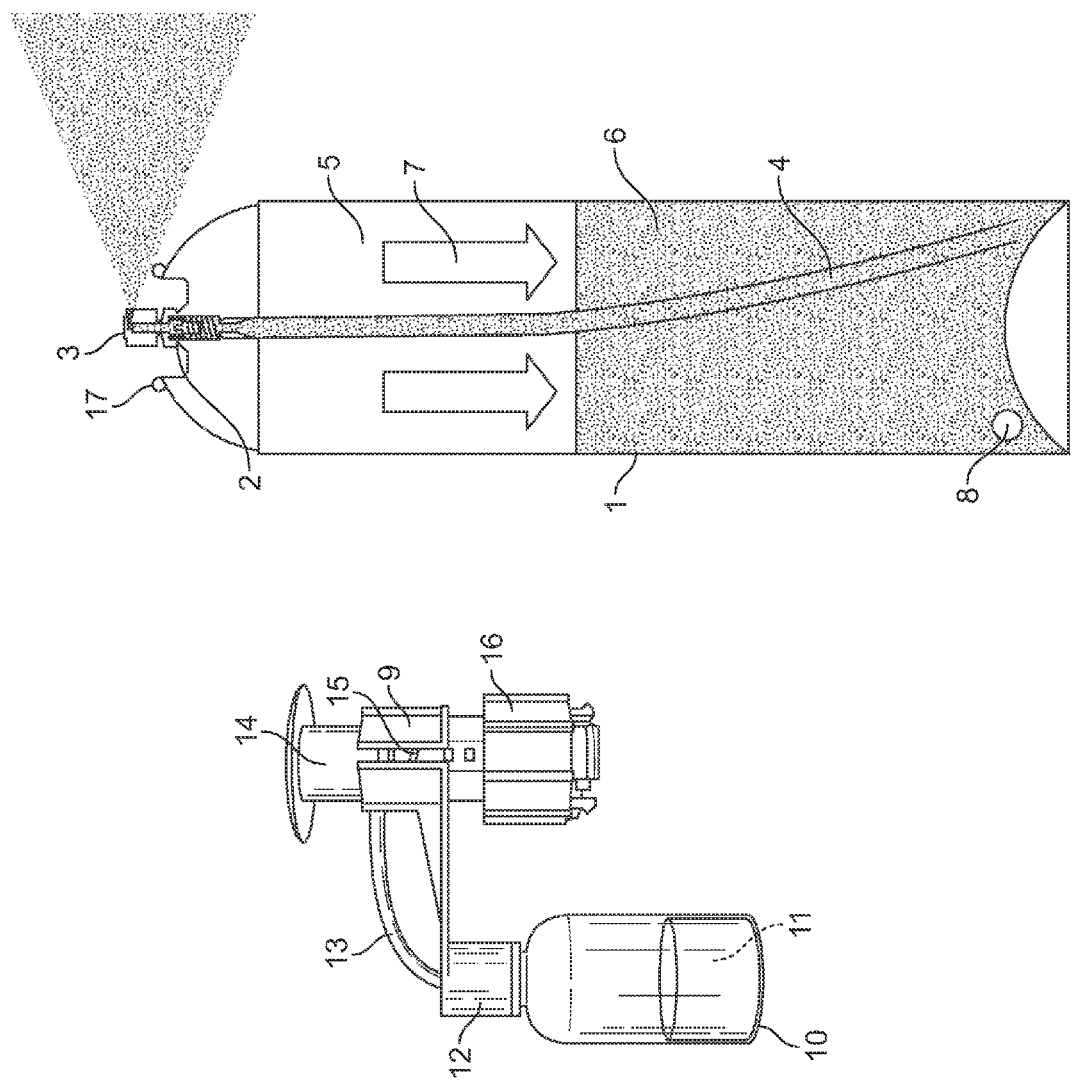

AMBIENT CURE PIGMENTED OR CLEAR TOP COAT NON-ISOCYANATE SYSTEM

FIELD OF THE DISCLOSURE

My invention relates to a system that allows for the preparation of a pressurized aerosol container of liquid, specifically a non-isocyanate containing, ambient curable coating formulation. Specifically, my invention relates to a system and process where a catalyst is injected into a pre-pressurized aerosol can that contains a mixture of a polymer and a crosslinker. The catalyst causes crosslinking to occur within the can resulting in a coating formation that can be applied directly to a substrate as an atomized spray.

BACKGROUND

One of the most significant developments in the field of liquid applications, including paints and other protective coatings, is the introduction and development of aerosolized coatings, most commonly referred to as an "aerosol can" or "spray paint." In particular, low volatile organic content solvent-born coatings find use in the automotive and boating industry as sealers, basecoats, and clear coats. The coatings industry has expended much effort to reduce emissions of volatile organic solvents. In 1977 the Environmental Protection Agency (EPA) adopted its current policy for controlling emissions of volatile organic compounds (VOCs) based on photochemical reactivity. VOCs are typically known as any compound of carbon, excluding carbon monoxide, carbon dioxide, carbonic acid, metallic carbides or carbonates, and ammonium carbonate, which participates in atmospheric photochemical reactions.

The EPA now considers photochemical reactivity as one consideration when controlling organic solvent emissions to prevent ozone or smog formation. Because the paint and coatings industry is typically a heavy user of solvents, photochemical reactivity is an attribute to consider during development of formulations. Photochemical reactivity is a measure of how much a compound reacts in the atmosphere and contributes to the formation of ozone. It is a measure of the unique characteristics of a compound relative to its ability to form ozone. Reactivity is also affected by the characteristics of the atmosphere in which it reacts, so it is not just a function of the chemical itself. Other chemicals that may be present in the air, and the intensity of the sunlight, can affect the reactivity of a chemical. Reactivity is often used rather loosely to refer to the rate of ozone formation, the amount of ozone formed, or both.

All states have adopted regulations of VOCs based on calculations of Maximum Incremental Reactivity (MIR). An incremental reactivity (IR) calculated for a volatile organic mixture where the emissions of $NO_x$ ($NO+NO_2$) have been adjusted to maximize the calculated MIR.

$$IR=\Delta[O_3]/\Delta[VOC]$$

For a specified set of meteorological conditions, emissions, and initial concentrations, the incremental reactivity of an organic compound is the change in the peak ozone concentration, in grams, divided by an incremental change in the initial concentration and emissions of the organic compound.

In conforming to regulations regarding VOC emissions from paints and coatings manufacturers must also meet customer requirements of several critical properties including fast out-of-dust time, fast tack-up, good water resistance, good chemical resistance, sag resistance, and excellent appearance. Achieving these properties must be performed in a range of climates such as from hot and humid to cold and dry with each localities' ambient temperature (i.e. no baking).

Many high performance, high solids coating compositions in the art are based on polymeric systems comprised of either polyester-based or polyacrylic-based polyols and crosslinking agents. These coatings are generally supplied as two component or "two-pack" systems or "2K" systems. In a typical two-pack system, the crosslinking agent is combined shortly before application, with curing being conducted at ambient or elevated temperatures. While two pack systems often provide high performance properties like corrosion and humidity resistance, resistance to solvents, ultraviolet stability and gloss retention there are notable limitations.

Two-pack systems utilizing isocyanate crosslinkers require special handling and storage operations to prevent premature reaction with moisture and to avoid human exposure. Further, the components of two-pack systems can only be mixed shortly prior to use and once mixed must be used and ultimately be discarded. Another disadvantage of isocyanate-crosslinking systems is that the quality of the coating is compromised by bubble formation during thick film application. To avoid human exposure one company has developed a 2K system where a first container of "A components" is placed inside a second container containing "B components." The A components could be a crosslinker that is necessary for reaction with the B components to form the final coating formulation. The first container can be ruptured to release the A components into the second container where they mix and react with the B components inside the second container. Alternatively, each container can be pressurized so that upon activation of a spray nozzle or valve will cause a stream of A components and B components to be expelled from both containers, mixed, reacted and applied to a substrate where it cures into a solid coating. These types of systems, however, are very expensive and difficult to manufacture.

My invention solves these problems and provides a new and improved liquid spray system that delivers an ambient curing, non-isocyanate coating formulation in an inexpensive container that is easily fabricated and is easy to prepare.

SUMMARY

My invention includes systems and methods for preparing liquid coating formations, specifically clear coats, basecoats, sealing coats and the like materials that can be sprayed or atomized from a pressurized handheld container onto a substrate. Preferably, these systems are configured such that an individual user can prepare and activate a pressurized spray container that can be used immediately to apply a coating that will cure in ambient conditions, e.g., without the application of heat. The spray system of my invention can take on a number of different configurations. Common attributes of each of the different configurations of my invention include, in combination, (1) a disposable low cost first container that is pre-filled and pressurized by a manufacturer to contain a mixture of at least a polymer having a primary hydroxyl functionality and a crosslinker with an alkoxymethyl functionality, and (2) a separate second smaller container containing an aromatic sulfonic acid catalyst. This second container is a stand alone container that is not part of, not incorporated into, and not integral with the first container.

In one embodiment of my invention there is presented a non-isocyanate clear coat aerosol system comprising a pressurized first container containing ingredients for formulating an ambient cured clear coat. Those ingredients include a propellant, a polymer with primary hydroxyl functionality and an amino crosslinker with alkoxymethyl functionality. A preferred container is a conventional "aerosol" or "spray paint" can having a valve, an attached dip tube, and a removable spray head attached to the valve, which is crimped to the top of can. Such a container is sized and configured to be handheld in one hand of a user. The first container also comprises a single internal volumetric space and does not contain a separate container having a second volumetric space.

The system also has a separate second container, which is not attached, connected, embodied within, or otherwise associated with the first container. This second container contains a catalyst formulated to initiate a polymerization reaction between the polymer and crosslinker when the catalyst is introduced into the first container immediately prior to use. The second container is smaller in volumetric size than the first container and is constructed of materials that are chemically resistant to catalyst. The system also includes a charging device configured to allow a user to inject the catalyst into the first container. Mixing the catalyst with the ingredients in the pressurized first container forms an aerosol clear coat that does not require application of heat to cure the clear coat when sprayed on a substrate.

The polymer with primary hydroxyl functionality preferably has an hydroxyl equivalent weight in the range of from about 435 to about 475. Depending on the specific type of polymer desired, a polymer with hydroxyl functionality can be achieved by incorporating a hydroxyl containing monomer, polyhdric alcohol or polyol. The primary hydroxyl functionality is important as a complementary functionality to introduce flexibility into the cured system or to plasticize the system. The hydroxyl groups serve as reactive sites for the amino crosslinker to allow crosslinking to occur, increasing the molecular weight. Such polymers are classified as mixtures and are obtained from manufacturers, such as, Cytec Industries, Inc., Arkema Coating Resins, Akzo Nobel, and Johnson Ploymer. A preferred polymer for use in my system can be selected from the group consisting of acrylic resins, polyester resins, alkyd resins, epoxy resins, polyurethane resins and mixtures thereof.

The amino crosslinker with alkoxymethyl functionality is achieved by the degree of methylation, degree and type of alkylation and degree of polymerization. Preferably the crosslinker has an equivalent weight in the range of from about 125 to about 200. A preferred type of amino crosslinker is one known as a specially alkylated crosslinker agent, which involves a special or proprietary combination of materials and processing variables resulting in a finished product with a benefit of a fast cure response in ambient conditions coupled with compatibility with hydroxyl functional resins. The amino crosslinkers useful in my system are classified as substances and are obtained from manufacturers, such as, Cytec Industries, Inc. and BASF. Preferred crosslinkers can be selected from the group consisting of melamine resins, urea resins, glycoluril resins, benzoguanamine resins, and mixtures thereof. The ratio of the polymer to crosslinker that is contained in the first container is in the range from about 70:30 to about 80:20 on a solids by weight basis. Although clear coating formulations are preferred, there are some instance when tinted or colored coatings are desired or necessary. In those situations, it is possible to add color, tint and/or pigment dispersion to the formulation mixture, provided that such coloring constituents are compatible with the base formulation.

As mentioned the separate, smaller second container of the system contains a catalyst formulation that when mixed into the polymer/crosslinker mixture in the first container initiates a cross linking or polymerization reaction between the polymer and the crosslinker. In typical known 2K products the polymer and crosslinker are each contained in a separate packages (A & B), with the catalyst typically contained in the same package with the hydroxy functional vehicle. When packages A & B are mixed the polymerization reaction begins. I believe my system is the first such aerosol system where only the catalyst is in a separate package or container, and the polymer and crosslinker are mixed together in one pressurized container. This is beneficial because is allows the manufacturing to be economical and cost effective. A preferred catalyst comprises a liquid solution of at least a maximum of 50% wt. of an aromatic sulfonic acid. Preferably, the catalyst is added in a diluted format for stability and to prevent "seeding." More preferably, the aromatic sulfonic acid is alcohol soluble and is selected from the group consisting of sulfonic or phosphoric, para toluene sulfonic acid (PTSA), dodecyl benzene sulfonic acid (DDBSA), dinonyl naphthalene disulfonic acid (DNNDSA), and mixtures thereof. Additionally, it is preferred that the catalyst is formulated such that the aromatic sulfonic acid active portion is from about 0.5 to about 5.0 wt. % based on the polymer and crosslinker solids. A unique aspect of my coating formulation system is that none of the chemical ingredients that make up the ambient cured clear coat are an isocyanate. This is important because of health and safety handling issues associated with isocyanate, especially respiratory concerns.

The system of my invention can also include ingredients in the first container that are known as product enhancers and can be selected from the group consisting of flow aids, UV inhibitors, stabilizers, and mixtures thereof Specific chemical compounds making up these enhancers include aliphatic alcohol, aliphatic hydrocarbons, aromatic hydrocarbons, halogenated aromatics, glycol ethers, glycol ether acetates, fluorocarbon modified polymers, polysiloxanes, polymethylalkylsiloxanes, hydroxylphenylbenzotriazoles, sterically hindered amines, modified castor oil derivatives, and modified ureas.

The system of my invention also contains a charging device that is configured to allow the transfer of the catalyst into the first container. The design and configuration of the charging device can be varied. In one embodiment the charging device is a pump assembly that is fitted to the second container and configured to pump the catalyst directly from the second container into the first container. The pump can be hand operated, driven by pneumatic air, or electrically driven. In either case the pump must be configured to overcome the pressure inside the first container and thus must be able to deliver the catalyst formulation at a pressure greater than the internal pressure of the first container. In another embodiment, the charging device comprises a pump and reservoir assembly, where the catalyst formulation is added to the reservoir from the second container and then the pump transfers it to the inside of the first container. In yet another embodiment, the second container of catalyst is provided by the manufacturer as a pre-pressurized container of catalyst that can be directly connected temporarily to the first container to cause a transfer of the catalyst directly into the first container. In this embodiment the charging device is the pressure fitting that can connect with the valve on the first container. This pre-pressured second container must be charged with enough propellant to create a pressure greater than the pressure in the first container such that when the two containers are connected there is sufficient driving force to transfer the catalyst. In each of the possible embodiments the charging device has an outlet fitting configured to form a connection with the valve associated with the first container to allow transfer of the catalyst into the first container.

The valve assembly of the first container is configured to accept or engage an outlet of the charging device such that the catalyst can be transferred into the first container where it then is mixed and reacts with the polymer/crosslinker mixture to form a coating formulation that can be sprayed on a substrate during a defined pot life. Preferably the transfer of catalyst is through a valve assembly located on the top of the first container. Alternatively, the first container may have a separate inlet fitting, for example, at the bottom of the can, to accept a fluid connection with the charging device associated with catalyst formulation.

In a preferred system, the first container is a conventional aerosol can design having a top valve assembly comprising a fitting, a flange and a dip tube, where the valve assembly is crimped closed during manufacturing. My system can also include proprietary inlet and outlet fittings for the first container and charging device, respectively. This means that the fittings are not of a common or standard design and instead are designed and configured like a key and lock. In other words, the male portion of the fitting will only fit into a like configured female fitting. This can be accomplished a number of ways including non-standard thread design, non-standard luer-lok, non-standard quick disconnects, and non-standard releasable snap locks to name a few. Using proprietary fittings prevents attachment of non-approved or non-compatible containers or charging devices, and thus prevents accidental mismatching of chemical ingredients. A coupler or adaptor can be used to connect the charging device to the fitting on the valve assembly to provide a fluid connection between the charging device and the interior volume of the first container container. This adaptor/coupler can be configured to be disposable or reusable and universably configured to fit a variety of manufacturers spray cans. In one preferred configuration the coupler provides a proprietary connection to the valve assembly on the first container and the outlet of the charging device such that no other manufacturer's products will connect with the coupler. This prevents a user of the system from using the wrong or improper container of catalyst that may not be compatible with the mixture in the first container. To achieve this keyed connection between the fittings or the coupler, the respective fittings or connectors having matching connectors, such as grooves, slots, splines, thread pitch, bayonet fittings, or the like keyed features that work similar to a key and lock combination.

The first container is prepared by a manufacturer and purchased or otherwise obtained by a user. The containers can be provided in a number of volumetric sizes, preferably 8 oz., 16 oz., and 20 oz. and contain at a minimum the mixture of polymer and crosslinker along with a propellant such that the internal volume pressure is at least 50 psi, preferably 80-100 psi. These first containers are preferably prepared by the following method. A manufacturer prepares a liquid composition containing the starting constituents for the pigmented or clear top coat formulation based on a hydroxyl functional polymer and an amino crosslinker along with solvents, diluents and other modifiers. These solvents, diluents and modifiers are selected from the group consisting of solvent based or solvent free paint additives and mixtures thereof. In formulating the mixture that will eventually be placed in the first container, the order of addition of the constituents is very important. The amino crosslinking agent will need to be added after the hydroxyl functional polymer has had solvents and necessary modifiers and additives incorporated. This uncatalyzed formulation can be prepared in advance with mechanical mixing in an area separate from the aerosol can filling area. Next, the formulation is added to an empty aerosol first container or can containing a non-steel agitator or mixing ball, for example a glass marble. The aerosol can may be lined with coating to prevent contamination of the polymer/crosslinker mixture. An aerosol valve is placed into the top of the can, the can is then crimped and filled with a suitable compatible propellant to achieve an internal pressure of at least 50 psi. Preferably, the propellant can be selected from the group consisting of propane, butane, Honeywell 1234, 2E, yf, dimethyl ether (DME), and mixtures thereof could also be used.

The acid catalyst constituent of my system is a flammable corrosive substance and requires special handling and protective equipment to avoid skin or eye contact. For these reasons, the system might include safety glasses or goggles and impermeable gloves. The catalyst may be supplied in a corrosive resistant second container, for example glass, in an undiluted or diluted format. Preferably, the catalyst will be supplied in a sealed second container having an associated charging device integral to the second container to avoid having the user come into contact with the catalyst. Such a sealed assembly will allow the user to transfer the catalyst into the aerosol can safely.

The system containing the pre-filled and pressured first container and the separate second container and charging device can then be shipped directly to a user or stocked at a retail store. Immediately prior to use, the ultimate end user or customer prepares the final formulation in the first aerosol container of a non-isocyanate containing, ambient cure pigmented or clear topcoat formulation as follows. The user first starts with the pressurized first container containing at least a propellant, a hydroxyl functional polymer, an amino crosslinker, and a non-metallic mixing ball. The first container has a valve connected to a removable spray head. The user then removes the spray head from the first container and takes a separate second container comprising a liquid aromatic sulfonic acid catalyst and transfers the liquid catalyst from the second container into the first container using a pump configured to be removably attachable to the valve and to allow transfer of the liquid catalyst into the first container. Once the charging device transfers the catalyst into the first container, the spray head is then reattached to the valve. The contents of the first container is then agitated and mixed by hand shaking the mixing ball for at least 30 seconds to mix the liquid catalyst with the polymer and crosslinker to induce a crosslinking reaction between the polymer and crosslinker The crosslinking reaction is allowed to proceed for at least 3 minutes to form an aerosol top coat formulation that cures without addition of heat. The dip tube will need to be cleared before spraying. The expected pot life once the mixing has completed is between about 3 minutes and about 60 minutes. Of course the time will be dependent on upon the application temperature and humidity. This pot life represents the time when the top coat formulation can be sprayed on a substrate and still cure to develop optimum performance properties.

Advantages of my system over known 2K systems include, but are not limited to, user safety and more environmentally friendly, while being economically beneficial to manufacture. Still further advantages of the present invention will become apparent upon reading and understanding the following detailed description of preferred embodiments. The invention also may take form in various parts and arrangement of parts. The accompanying drawings are only for purposes of illustrating preferred embodiments and are not to be construed as limiting the invention.

BRIEF DESCRIPTION OF THE FIGURES

The advantages and features of the present invention will become better understood with reference to the following more detailed description and claims taken in conjunction with the accompanying drawings, in which like elements are identified with like symbols, and in which:

FIG. 1 is a schematic representation of one configuration of the clear coat spray system of my invention.

DETAILED DESCRIPTION

To my knowledge there exists no aerosol top coat, pigmented or clear, aerosol spray system where both a polymer with primary hydroxyl functionality and an amino crosslinker with alkoxymethyl functionality are both contained in a first pressurized container and a catalyst formulation is contained in a separate container that is not incorporated in or otherwise integral with the first container. My system allows the catalyst formulation to be added to the first container to initiate a polymerization reaction to form a sprayable pigmented or clear top coat that is cured under ambient conditions.

Turning to FIG. 1 there is shown a first container 1 that has an interior volume 5. This container can be comprised of any known material that can be pressurized and that will not react with the clear coat chemical constituents. The first container can be fabricated from low cost materials such as tin, aluminum or like materials. Regardless of the material of construction, it is essential that the disposable container can withstand internal pressurization of about 100 psig. The volume 5 should be at least capable of holding greater than 2 oz. of liquid, most preferably greater than 5 oz. of liquid related to the volumetric aerosol container size. At the upper end of disposable container 1 there is a valve assembly 2 and a removable spray head 3. The valve assembly 2 comprises a dip tube 4 that is in fluid communication with the liquid precursors 6 of the pigmented or clear top coat, namely at a minimum a polymer with primary hydroxyl functionality and an amino crosslinker with alkoxymethyl functionality. Of course as previously mentioned, other ingredients such as product enhancers can also be included the liquid initially contained in the first container.

The first container is pressurized to at least greater that 50 psi by using the propellant alone or in combination with dried (moisture-free) compressed air, nitrogen, carbon dioxide, or other relatively inert gas or mixtures of gases. Charging of the charge can 1 with pressure and a propellant would be performed by the manufacturer. The pressurized propellant exerts a downward pressure force 7 in the upper portion of volume 5 on the liquid material 6. A mixing ball 8 is also included to allow the liquid constituents to be mixed with the catalyst formulation when it is injected into the first container. Preferably, the mixing ball is made from a material that will not react with any of the clear coat ingredients.

My system also incudes a second container 10 that is configured to form an air tight seal so as to hold a catalyst formulation 11.

As illustrated in the exemplified embodiment, the second container 10 can be directly attached to a charging device 9. As shown, charging device 9 connects with the second container 10 through a cap 12, which can be a screw fit, snap fit, or permanently sealed fit. Alternatively, charging device 9 could have its own dedicated container that the user would fill with catalyst from the second container. A transfer tube 13 is in fluid communication with the catalyst 11 and directly connected to a hand pump portion 14 that is biased with a spring 15 and in fluid communication a pressure connector 16. In use, the spray head 3 is removed from valve assembly 2 and connector 16 is attached to the top 17 of the first container 1 such that the connector 16 engages valve assembly 2 to create a fluid connection. Once the fluid connection is established, the user activates pump 14 by hand in an up and down motion overcoming the biasing force of spring 15. This pumping action/motion causes the catalyst to flow from container 10 through tube 13, through pump 14, through connector 16, through valve assembly 2 down through dip tube 4 and into the liquid ingredients 6. Once the required amount of catalyst is transferred from the second container 10 into first container 1, the connector 16 is disengaged from the top 17 of container 1. The user then shakes and/or inverts container 1 causes the mixing ball 8 to agitate and mix the catalyst with the polymer and crosslinker mixture 6 causes crosslinking to occur and thereby forming the final clear coat formulation. The spray head 3 is then reattached to the valve assembly 2 and after at least 3 minutes of reaction time, the dip tube is cleared and the final top coat product is ready to be sprayed on a substrate.

Connector 16 and valve assembly 2 could be configured with fittings specifically keyed to each other and will not attach/connect to another manufacturer's fitting. In this way the charging device from one manufacturer/supplier cannot be inadvertently connected/attached to the valve assembly from another manufacturer/supplier.

The invention has been described with reference to a preferred embodiment. Obviously, modifications and alterations will occur to others upon reading and understanding the preceding specification. It is intended that the invention be construed as including all such alterations and modifications insofar as they come within the scope of the appended claims or the equivalents thereof.

The invention claimed is:

1. A non-isocyanate clear coat aerosol system comprising,
 a. pressurized first container containing ingredients for formulating an ambient cured clear coat, the ingredients comprising,
  i. a propellant;
  ii. a polymer with primary hydroxyl functionality; and
  iii. an amino crosslinker with alkoxymethyl functionality,
  where the container has a valve and a removable spray head,
 b. a separate second container, not attached or connected to the first container, containing a catalyst formulated to initiate a polymerization reaction between the polymer and crosslinker when the catalyst is introduced into the first container; and
 c. a charging device configured to allow a user to inject the catalyst into the first container,
  wherein mixing the catalyst with the ingredients in the pressurized container forms an aerosol clear coat that does not require application of heat to cure the clear coat when sprayed on a substrate.

2. The system of claim 1 where the polymer has an hydroxyl equivalent weight in the range of from about 435 to about 475.

3. The system of claim 1 where the crosslinker has an equivalent weight in the range of from about 125 to about 200.

4. The system of claim 1 where the ratio of the polymer to crosslinker is in the range from about 70:30 to about 80:20 on a solids by weight basis.

5. The system of claim 1 where the charging device comprises a pump and reservoir assembly configured for manual hand operation and has an outlet fitting configured to form a connection with the valve to allow transfer of the catalyst into the first container.

6. The system of claim 1 where the catalyst comprises a liquid solution of a maximum of about 50% wt. of an aromatic sulfonic acid.

7. The system of claim 6 where the aromatic sulfonic acid is alcohol soluble.

8. The system of claim 7 where the catalyst is formulated such that the aromatic sulfonic acid active portion is from about 0.5 to about 5.0 wt. % based on the polymer and crosslinker solids.

9. The system of claim 1 where the ingredients in the first container further comprises product enhancers selected from the group consisting of flow aids, UV inhibitors, solvents, stabilizers, and mixtures thereof.

10. The system of claim 1 where the first container is configured in a shape and size that it can be held in one hand of a user.

11. The system of claim 1 where the first container comprises a single internal volumetric space and does not contain a separate container having a second volumetric space.

12. The system of claim 1 where dimethyl ether is the propellant and is present in the container in an amount such that the container has an internal volume pressure of at least 50 psi.

13. A method of preparing an aerosol container containing an ambient cure clear coat comprising,
 a. obtaining a system comprising,
  i. a pressurized first container comprising,
   1. a propellant;
   2. a hydroxyl functional polymer;
   3. an amino crosslinker; and
   4. a non-metallic mixing ball,
  where the container has a valve connected to a removable spray head
  ii. a separate second container comprising a liquid aromatic sulfonic acid catalyst;
 b. removing the spray head from the valve;
 c. transferring the liquid catalyst from the second container into the first container using a pump configured to be removably attachable to the valve allow transfer of the liquid catalyst into the first container;
 d. reattaching the spray head to the valve;
 e. agitating the mixing ball for at least 30 seconds to mix the liquid catalyst with the polymer and crosslinker; and
 f. inducing a cross-linking reaction between the polymer and crosslinker for at least 3 minutes to form an aerosol top coat formulation that cures without addition of heat.

* * * * *